US010628098B2

(12) United States Patent
Nakano

(10) Patent No.: US 10,628,098 B2
(45) Date of Patent: Apr. 21, 2020

(54) IMAGE READING APPARATUS AND MEDIUM STORING PROGRAM EXECUTABLE BY IMAGE READING APPARATUS FOR SENDING IMAGE DATA TO DESTINATION INCLUDED IN ACQUIRED E-MAIL SETTING INFORMATION

(71) Applicant: Brother Kogyo Kabushiki Kaisha, Nagoya-shi, Aichi-ken (JP)

(72) Inventor: Katsuya Nakano, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 2 days.

(21) Appl. No.: 16/030,360

(22) Filed: Jul. 9, 2018

(65) Prior Publication Data
US 2019/0020769 A1    Jan. 17, 2019

(30) Foreign Application Priority Data
Jul. 11, 2017  (JP) .................................. 2017-135193

(51) Int. Cl.
*G06F 3/12* (2006.01)
*H04N 1/00* (2006.01)

(52) U.S. Cl.
CPC .......... *G06F 3/1257* (2013.01); *G06F 3/1243* (2013.01); *G06F 3/1253* (2013.01); *H04N 1/00225* (2013.01)

(58) Field of Classification Search
CPC combination set(s) only.
See application file for complete search history.

(56) References Cited

U.S. PATENT DOCUMENTS

| 7,136,903 | B1 * | 11/2006 | Phillips | .................... G06F 16/10 |
| | | | | 709/217 |
| 8,270,003 | B2 * | 9/2012 | Lum | .................. G03G 15/5087 |
| | | | | 358/1.13 |
| 2003/0084050 | A1 * | 5/2003 | Hall | ........................ G06Q 10/10 |
| 2006/0238808 | A1 * | 10/2006 | Sanchez | ................. G06K 15/00 |
| | | | | 358/1.16 |

(Continued)

FOREIGN PATENT DOCUMENTS

| JP | 2002-041413 A | 2/2002 |
| JP | 2004-040206 A | 2/2004 |

*Primary Examiner* — Barbara D Reinier
(74) *Attorney, Agent, or Firm* — Banner & Witcoff, Ltd.

(57) ABSTRACT

An image reading apparatus includes a scanner configured to read an image from a document, and a controller. The controller is configured to: output a template for inputting e-mail setting information including at least a destination; acquire the e-mail setting information included in an e-mail setting file from a storage apparatus in which the e-mail setting file is stored; and transmit image data read by the scanner to the destination included in the acquired e-mail setting information. The e-mail setting file is prepared by inputting the e-mail setting information into the template outputted. The storage apparatus has an area corresponding to user information, and the e-mail setting file is stored in the area corresponding to the user information of the storage apparatus. The controller accesses the e-mail setting file stored in the area corresponding to the user information by utilizing the user information.

11 Claims, 14 Drawing Sheets

(56) References Cited

U.S. PATENT DOCUMENTS

| | | | |
|---|---|---|---|
| 2007/0133876 A1* | 6/2007 | Chande | G06F 17/243 |
| | | | 382/181 |
| 2008/0155025 A1* | 6/2008 | Xu | G06Q 10/10 |
| | | | 709/206 |
| 2012/0144478 A1* | 6/2012 | Homma | H04N 1/00411 |
| | | | 726/19 |
| 2017/0094073 A1* | 3/2017 | Watanabe | H04N 1/00225 |
| 2018/0075008 A1* | 3/2018 | Ganta | G06Q 10/107 |
| 2018/0095705 A1* | 4/2018 | Roberts | G06F 3/1204 |
| 2018/0173477 A1* | 6/2018 | Porwal | G06F 3/1243 |
| 2019/0034403 A1* | 1/2019 | Pal | G06F 17/248 |
| 2019/0373125 A1* | 12/2019 | Sakamoto | H04N 1/00225 |

* cited by examiner

```
Send To = "ADDRESS 1 OF DESTINATION; ADDRESS 2;...;"
Send Cc = " "
Send Bcc = " "
SubjectLine = "SUBJECT OF E-MALE"
MailText:Start
*WRITE SENTENCE HERE*
MailText:End
```
140

IMAGE READING APPARATUS AND MEDIUM STORING PROGRAM EXECUTABLE BY IMAGE READING APPARATUS FOR SENDING IMAGE DATA TO DESTINATION INCLUDED IN ACQUIRED E-MAIL SETTING INFORMATION

CROSS REFERENCE TO RELATED APPLICATION

The present application claims priority from Japanese Patent Application No. 2017-135193 filed on Jul. 11, 2017, the disclosure of which is incorporated herein by reference in its entirety.

BACKGROUND

Field of the Invention

The present invention relates, for example, to an image reading apparatus for reading an image from a document.

Description of the Related Art

An image reading apparatus is known, which can execute the Scan to E-mail process such that the image data, which is prepared by reading an image, is transmitted by e-mail. Japanese Patent Application Laid-open No. 2002-41413 describes an example of the image reading apparatus capable of executing the Scan to E-mail process.

SUMMARY

In the case of the technique described in Japanese Patent Application Laid-open No. 2002-41413, the e-mail setting information such as an e-mail address and the like, which is used when the image data is transmitted in the Scan to E-mail process, is inputted into an e-mail in accordance with a predetermined format in an information processing apparatus such as PC or the like, and the e-mail is transmitted to the image reading apparatus. Then, the image reading apparatus, which receives the e-mail, transmits the image data by using the e-mail setting information inputted into the e-mail. Accordingly, the e-mail setting information can be inputted by means of the information processing apparatus such as PC or the like having the high operability. It is possible to mitigate the load exerted on the user. However, it is necessary that the e-mail setting information should be inputted into the e-mail in accordance with the predetermined format. Therefore, if the user does not know the predetermined format, it is difficult to input the e-mail setting information. The present teaching has been made taking the foregoing circumstances into consideration, an object of which is to provide such a technique that the e-mail setting information can be appropriately inputted even in the case of any user who does not know the predetermined format.

According to a first aspect of the present teaching, there is provided an image reading apparatus including: a scanner configured to read an image from a document; and a controller configured to: output a template for inputting e-mail setting information including at least a destination; acquire the e-mail setting information included in an e-mail setting file from a storage apparatus in which the e-mail setting file is stored; and transmit image data read by the scanner to the destination included in the acquired e-mail setting information, wherein: the e-mail setting file is prepared by inputting the e-mail setting information into the outputted template, the storage apparatus has an area corresponding to user information, the e-mail setting file is stored in the area corresponding to the user information of the storage apparatus, and the controller is configured to access the e-mail setting file stored in the area corresponding to the user information by utilizing the user information.

According to a second aspect of the present teaching, there is provided a non-transitory computer-readable medium storing a program executable by a computer of an image reading apparatus provided with a scanner for reading an image from a document, the program causing the computer of the image reading apparatus to: output a template for inputting e-mail setting information including at least a destination; acquire the e-mail setting information included in an e-mail setting file from a storage apparatus in which the e-mail setting file is stored; and transmit image data read by the scanner to the destination included in the e-mail setting information acquired, wherein the e-mail setting file is prepared by inputting the e-mail setting information into the template outputted, the storage apparatus has an area corresponding to user information, the e-mail setting file is stored in the area corresponding to the user information of the storage apparatus, and the program causes the computer of the image reading apparatus to access the e-mail setting file stored in the area corresponding to the user information by utilizing the user information.

According to the foregoing aspects of the present teaching, the template, which is available to input the e-mail setting information, is outputted by the image reading apparatus. Then, the e-mail setting file, which is prepared by inputting the e-mail setting information into the template, is stored in the area corresponding to the user information in the storage apparatus. The image reading apparatus acquires, from the storage apparatus, the e-mail setting information of the e-mail setting file of the area corresponding to the user information by utilizing the user information. According to the present teaching, the user can input the e-mail setting information by utilizing the template. Therefore, the e-mail setting information can be appropriately inputted even by any user who does not know the predetermined format. Note that the image reading apparatus executes the Scan to E-mail process by utilizing the acquired e-mail setting information.

DESCRIPTION OF THE EMBODIMENTS

<Construction of Communication System>

Figure 1:
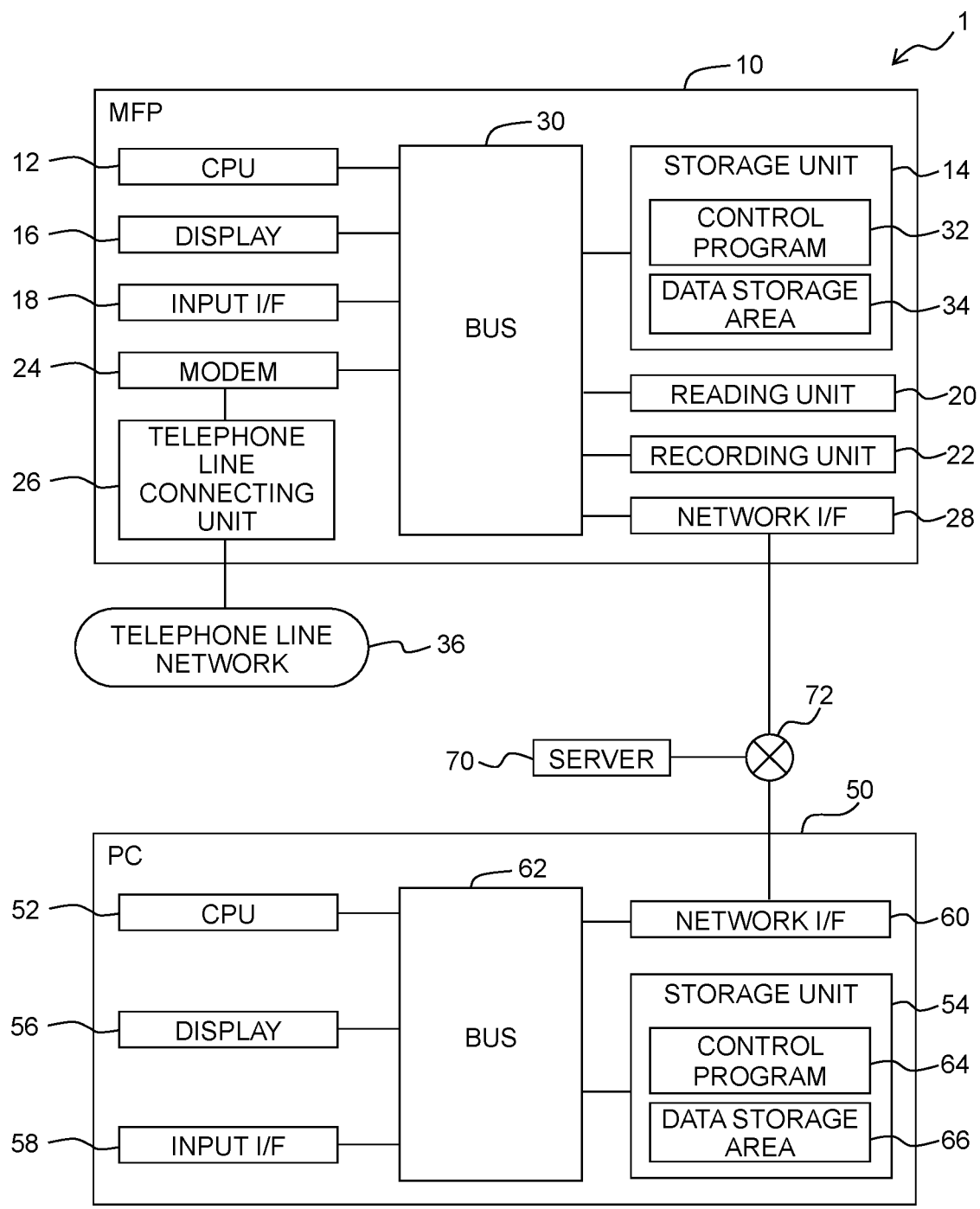
FIG. 1 depicts a block diagram illustrating a communication system.

As depicted in FIG. 1, the communication system 1 is provided with MFP (abbreviation of Multifunction Peripheral) (example of the image reading apparatus of the present teaching) 10, PC (abbreviation of Personal Computer) (example of the information processing apparatus of the present teaching) 50, and a server (example of the storage apparatus and the server of the present teaching) 70. Note that MFP 10, PC 50, and the server 70 are connected to the internet 72, which can make communication via the internet 72.

MFP 10 principally comprises CPU (abbreviation of Central Processing Unit) (example of the controller and the computer of the present teaching) 12, a storage unit 14, a display (example of the display unit of the present teaching) 16, input I/F 18, a reading unit (example of the scanner of the present teaching) 20, a recording unit 22, a modem 24, a telephone line connecting unit 26, and network I/F 28. These constitutive components can make communication with each other via a bus 30.

CPU 12 executes the process in accordance with a control program (example of the program of the present teaching) 32 stored in the storage unit 14. The control program 32 is a program to execute the Scan to E-mail process. In the following description, CPU 12, which executes the control program 32, is also simply described with the program name in some cases. For example, the description "control program 32 performs" sometimes means that "CPU 12, which executes the control program 32, performs" in some cases.

Note that the storage unit 14 is constructed by combining, for example, RAM (abbreviation of Random Access Memory), ROM (abbreviation of Read Only memory), a flash memory, HDD (abbreviation of Hard Disk Drive), and a buffer provided for CPU 12. Further, the storage unit 14 is provided with a data storage area 34. The data storage area 34 is an area for storing, for example, the data required to execute, for example, the control program 32.

The display 16 is provided with a display surface for displaying various functions of MFP 10. Examples of the display are exemplified, for example, by LCD (abbreviation of Liquid Crystal Display), organic EL (abbreviation of Electro Luminescence), and the plasma display. Input I/F 18 is, for example, a touch panel which is constructed integrally with the display 16. Input I/F 18 accepts the operation performed by a user, for example, with respect to an icon or a button displayed on the display 16. A hard key or the like is also available other than the touch panel.

The reading unit 20 is a scanner which reads the image. The reading unit 20 is, for example, a CCD image sensor or a contact image sensor. Accordingly, the scan process is executed by MFP 10. Further, the recording unit 22 is a printing mechanism, which is exemplified, for example, by an ink-jet head. CPU 12 inputs a driving signal into the recording unit 22. When the recording unit 22 is the ink-jet head, the recording unit 22 discharges inks from nozzles in accordance with the inputted driving signal. Accordingly, the copy process is executed by MFP 10.

The modem 24 modulates the document data to be transmitted by the facsimile function into the signal capable of being transmitted to the telephone line network 36 so that the signal is transmitted by the aid of the telephone line connecting unit 26. Further, the modem 24 receives the signal inputted by the aid of the telephone line connecting unit 26 from the telephone line network 36 so that the document data is demodulated. Accordingly, the facsimile process is executed by MFP 10.

Network I/F 28 is an interface to transmit/receive the signal with respect to the external apparatus via the internet 72. Accordingly, MFP 10 can transmit/receive the data via the internet 72 with respect to PC 50 and the server 70.

Further, PC 50 principally comprises CPU 52, a storage unit 54, a display 56, input I/F 58, and network I/F 60. These constitutive components can make communication with each other via a bus 62.

CPU 52 executes the process in accordance with a control program 64 stored in the storage unit 54. The control program 64 is a program to register, in the server 70, the information in relation to, for example, the destination of the e-mail to be used for the Scan to E-mail process. Note that CPU 52, which executes the control program 64, is also simply described by the program name in some cases. For example, the description "control program 64 performs" sometimes means that "CPU 52, which executes the control program 64, performs".

Further, the storage unit 54 is provided with a data storage area 66. The data storage area 66 is an area for storing, for example, the data required to execute the control program 64. Note that the storage unit 54 is constructed by combining, for example, RAM, ROM, a flash memory, HDD, and a buffer provided for CPU 52.

The display 56 displays a screen based on the image data. As for the display 56, for example, LCD, the organic EL display, and the plasma display are used. The input I/F 58 includes, for example, a keyboard and a mouse. The input I/F 58 is an interface for accepting the information input operation performed by the user.

The network I/F 60 is an interface to transmit/receive the signal with respect to the external apparatus via the internet 72. Accordingly, PC 50 can transmit/receive the data via the internet 72 with respect to MFP 10 and the server 70.

<Scan to E-Mail Process in MFP>

MFP 10 can execute a plurality of types of the image processing including, for example, the copy process, the scan process, and the facsimile process. Then, in the scan process, for example, the Scan to E-mail process and the Scan to Server process are executed. However, an explanation will be made in this section about the Scan to E-mail process.

In the Scan to E-mail process, the reading of a document is executed by MFP 10. The scan data, which is prepared by the reading of the document, is transmitted by e-mail to a registered e-mail address (example of the destination of the present teaching). However, in the case of the conventional Scan to E-mail process, for example, any e-mail address, which is the transmission destination of the scan data, should be inputted by using input I/F 18 of MFP 10, wherein the load exerted on the user is large. Further, in MFP 10, a desired e-mail address can be selected from a large number of e-mail addresses having been already registered in MFP 10. However, if a large number of e-mail addresses is registered, a huge storage area is required. Further, even if a huge storage area exists, it is difficult to select an e-mail address or e-mail addresses intended to be used by a user from the large number of e-mail addresses.

Figure 2:
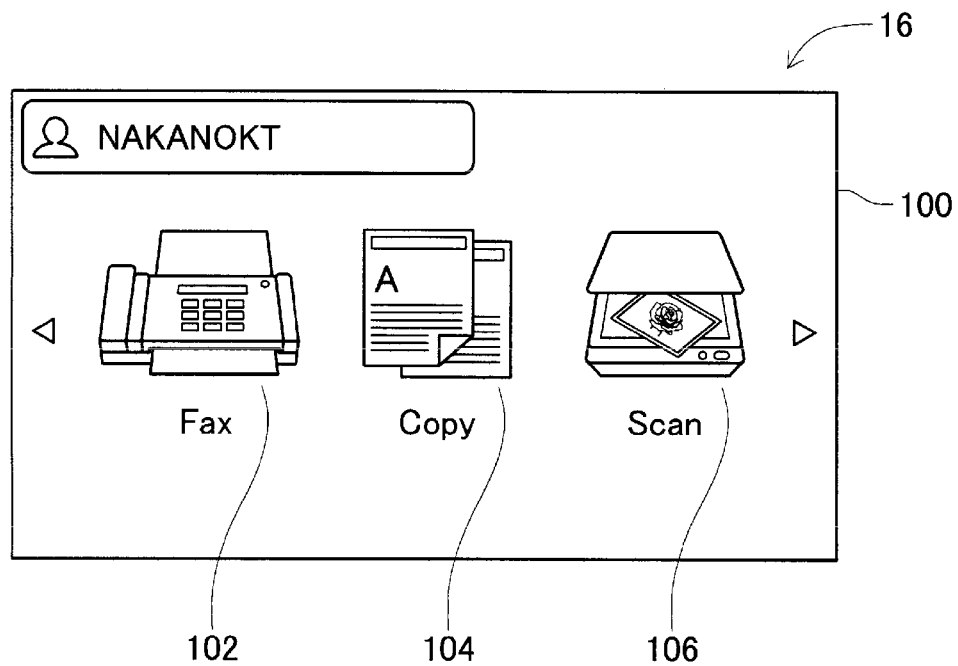
FIG. 2 depicts a login screen.

Specifically, if the user inputs user ID (example of the user information of the present teaching) and a password into MFP 10, MFP 10 sends user ID and the password to an authentication server (not depicted) connected to the internet 72 to perform the login request. The authentication server is provided with a table for storing user ID and the password while being correlated with each other for each of users. The login authentication is performed by making reference to the table. In particular, the authentication server determines whether user ID sent from MFP 10 is stored in the table. If user ID is stored in the table, the authentication server determines whether the password, which is stored while being correlated with user ID, is coincident with the password sent from MFP 10. If the password, which is sent from MFP 10, is coincident with the password which is stored in the table, the login authentication is successfully completed. On the other hand, if user ID, which is sent from MFP 10, is not stored in the table, or if the password is not correct, then the login authentication ends in failure. If the login authentication is successfully completed, a login screen 100 depicted in FIG. 2 is displayed on the display 16. A facsimile button 102, a copy button 104, and a scan button 106 are displayed on the login screen 100.

Figure 3:
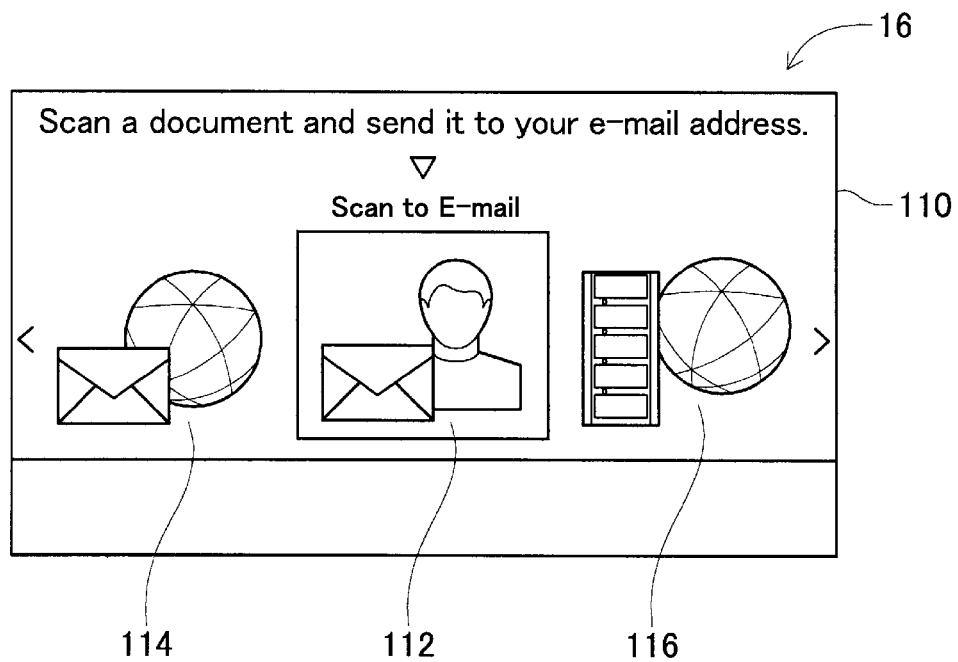
FIG. 3 depicts a scan process selection screen.

If the scan button 106 is operated on the login screen 100, a scan process selection screen 110 depicted in FIG. 3 is displayed on the display 16. A Scan to E-mail button 112 for executing the Scan to E-mail process and buttons 114, 116 for executing other scan processes are displayed on the scan process selection screen 110.

Then, if the Scan to E-mail button 112 is operated on the scan process selection screen 110, a destination setting screen 120 is displayed on the display 16. An address registration button 122 and an address selection button 124 are displayed on the destination setting screen 120.

The address registration button 122 is a button to register the e-mail address. When the user operates the address registration button 122 to input the e-mail address, the e-mail address of the transmission destination for the Scan to E-mail process is thereby registered. Accordingly, the transmission destination for the Scan to E-mail process is set.

Further, the address selection button 124 is a button to select an arbitrary e-mail address from the e-mail addresses having been already registered in MFP 10. When the user operates the address selection button 124, the e-mail addresses registered in MFP 10 are thereby displayed on the display 16. Then, when the user selects a desired e-mail address from the displayed e-mail addresses, the transmission destination for the Scan to E-mail process is thereby set.

As described above, if the user inputs the e-mail address by using input I/F 18 of MFP 10, the load exerted on the user is large. In particular, the operability of input I/F 18 of MFP 10 is generally low. Therefore, the input of the e-mail address exerts the large load on the user. Further, if a large number of e-mail addresses are registered in MFP 10, the load is also exerted on the user by the selection of an e-mail address desired by the user from a large number of e-mail addresses. In particular, the display 16 of MFP 10 is relatively small. Therefore, if a large number of e-mail addresses are registered, it is necessary to perform, for example, the screen exchange or switching, which exerts the large load on the user.

Taking the foregoing circumstances into consideration, in the case of the communication system 1, the template (hereinafter referred to as "setting information inputting template") (example of the template of the present teaching), which is used to input the information in relation to the e-mail setting such as the e-mail address or the like (hereinafter referred to as "e-mail setting information") (example of the e-mail setting information of the present teaching), is uploaded by MFP 10 to the server 70. Further, the storage area of the server 70 is comparted by folders corresponding to respective user ID's. The setting information inputting template is uploaded to the folder of the server 70 corresponding to the user who executes the Scan to E-mail process. The user accesses the folder by means of PC 50, and the user inputs the e-mail setting information by using the template with input I/F 58 such as a keyboard, a mouse or the like. Accordingly, the file including the e-mail setting information (hereinafter referred to as "e-mail setting file") (example of the e-mail setting file of the present teaching) is registered in the server 70.

As described above, the user can input the e-mail setting information by using, for example, the keyboard having the high operability. Therefore, it is possible to mitigate the load exerted on the user. Further, the use of the template makes it possible to mitigate the load of the input of the e-mail setting information. Further, the setting information inputting template is stored in the folder comparted for each of user ID's. Therefore, only the e-mail setting file, which includes the e-mail setting information inputted by the user who executes the Scan to E-mail process, is registered in the folder. The user can select a desired e-mail setting file from the e-mail setting files registered by himself/herself. Therefore, the load exerted on the user is mitigated.

Specifically, the folder (example of the area of the present teaching), which is comparted for each of user ID's registered in the authentication server, is prepared in the server 70. Note that any file, which includes, for example, the setting information inputting template and the e-mail setting file, is not stored in each of the folders in the initial setting. If the user inputs user ID and the password into MFP 10, then MFP 10 makes the login request with respect to the authentication server. The login authentication is performed by using inputted user ID and the password as described above. If the login authentication is successfully completed, the login screen 100 depicted in FIG. 2 is displayed on the display 16. If the scan button 106 is operated on the login screen 100, the scan process selection screen 110 depicted in FIG. 3 is displayed on the display 16.

If the Scan to E-mail button 112 is operated on the scan process select screen 110, MFP 10 accesses the folder (hereinafter referred to as "corresponding folder") which corresponds to inputted user ID. In this procedure, MFP 10 determines whether at least one of the setting information inputting template and the e-mail setting file is stored in the corresponding folder. As described above, any file, which includes, for example, the setting information inputting template and the e-mail setting file, is not stored in the initial setting in the corresponding folder of the server 70. Therefore, it is determined that both of the setting information inputting template and the e-mail setting file are not stored in the corresponding folder.

Figure 5:
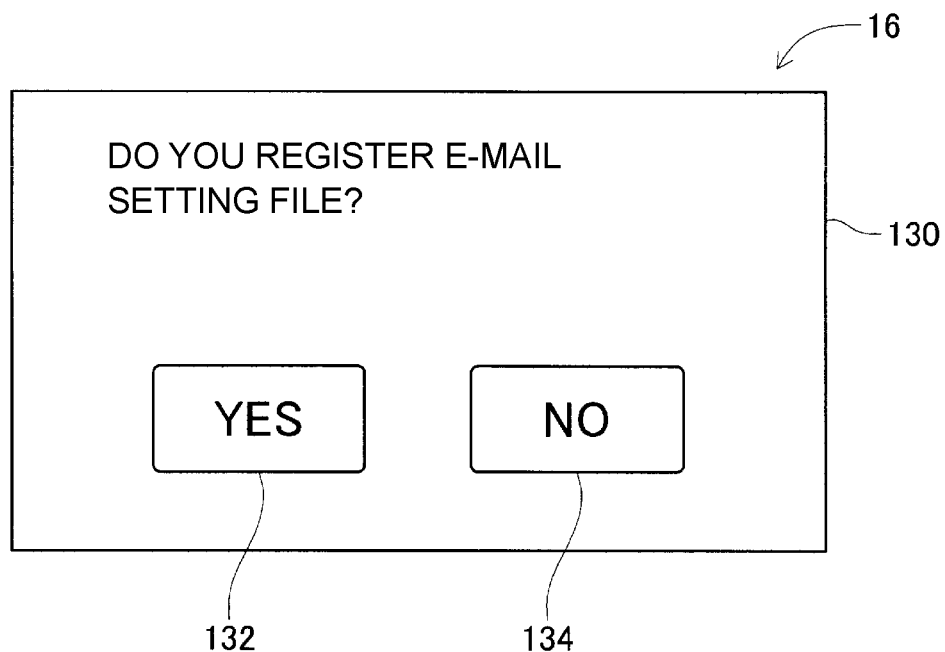
FIG. 5 depicts a setting intension confirmation screen.

If the Scan to E-mail button 112 is operated on the scan process selection screen 110, and it is determined that both of the setting information inputting template and the e-mail setting file are not stored in the corresponding folder, then a setting intension confirmation screen 130 depicted in FIG. 5 is displayed on the display 16.

Note that when the Scan to E-mail button 112 is operated on the scan process selection screen 110, a waiting screen (not depicted) is displayed on the display 16 during a period until the termination of the access to the corresponding folder and the determination whether the file is stored in the corresponding folder. Then, if the access to the corresponding folder and the determination whether the file is stored in the corresponding folder are terminated, and it is determined that any file is not stored in the corresponding folder, then the setting intension confirmation screen 130 is displayed on the display 16.

Further, as depicted in FIG. 5, a YES button 132 and a NO button 134 are displayed on the setting intension confirmation screen 130 displayed in accordance with the operation of the Scan to E-mail button 112. Then, if the YES button 132 is operated, MFP 10 thereby uploads the setting information inputting template 140 depicted in FIG. 6 to the accessing corresponding folder of the server 70.

The setting information inputting template 140 includes a plurality of input columns (fields) including, for example, an input column for the address of a person to whom the scan data is intended to be transmitted, an input column for the subject of the e-mail when the scan data is transmitted, and an input column for the text of the e-mail when the scan data is transmitted. Note that the template 140 may also include an input column for inputting, for example, the scan setting (for example, color/monochrome, resolution) when the scan is executed in Scan to E-mail, in addition to the input columns for inputting the information required to prepare the e-mail when Scan to E-mail is executed.

In the next place, when the setting information inputting template 140 is uploaded to the corresponding folder of the server 70, MFP 10 transmits, by the e-mail to PC 50, URL (abbreviation of Uniform Resource Locator) (hereinafter referred to as "access information") (example of the access information of the present teaching) capable of accessing the corresponding folder of the server 70. Note that the user registers the e-mail address used by himself/herself when user ID and the password are set for the authentication server. Therefore, user ID, the password, and the e-mail address are stored in the authentication server while being correlated with each other. Therefore, MFP 10 can acquire the e-mail address of the user from the authentication server when the login authentication is successfully completed. Therefore, MFP 10 transmits the access information to the e-mail address correlated with user ID used when the login is performed. Accordingly, the access information is transmitted by the e-mail to PC 50.

Then, if PC 50 receives the access information, PC 50 accesses the corresponding folder of the server 70 by using access information. In other words, URL, which makes it possible to access the corresponding folder of the server 70, is transmitted as the access information to PC 50 by the e-mail. The user left-clicks URL written in the e-mail by means of the mouse, and thus PC 50 accesses the corresponding folder of the server.

The setting information inputting template 140, which is uploaded from MFP 10, is stored in the corresponding folder of the server 70. Therefore, a screen, which is available to select the setting information inputting template 140, is displayed on the display 56 of PC 50 which has accessed the corresponding folder. Then, the setting information inputting template 140 is selected on the screen, and thus the setting information inputting template 140 is displayed on the display 56 of PC 50.

As described above, the setting information inputting template 140 includes the plurality of input columns including, for example, the input column for inputting the address of the person to whom the scan data is intended to be transmitted. The user inputs the text data corresponding to the input columns, i.e., the e-mail setting information into the setting information inputting template 140, and thus the user prepares the e-mail setting file corresponding to the object. Accordingly, even in the case of the user who does not know the method for inputting the e-mail setting information, it is possible to appropriately input the e-mail setting information and prepare the e-mail setting file. Further, the user can input the e-mail setting information by means of input I/F 58 such as the keyboard or the like having the high operability. Therefore, it is possible to prepare the e-mail setting file without exerting any large load on the user.

When the user prepares the e-mail setting file by using the setting information inputting template 140, the e-mail setting file is stored in the corresponding folder of the server 70. In this procedure, the e-mail setting file can be stored by using any arbitrary file name. Accordingly, the e-mail setting file is registered in the corresponding folder of the server 70.

When the user inputs the login information such as user ID or the like into MFP 10 after the e-mail setting file is registered in the corresponding folder of the server 70, and the Scan to E-mail button 112 is further operated, then MFP 10 accesses the corresponding folder of the server 70 to determine that the e-mail setting file is stored in the corresponding folder. In this procedure, MFP 10 acquires the file name of the file stored in the corresponding folder. In other words, if the Scan to E-mail button 112 is operated on the scan process selection screen 110, and it is determined that the file is stored in the corresponding folder, then MFP 10 acquires the file name of the file stored in the corresponding folder.

Figures 6, 7:
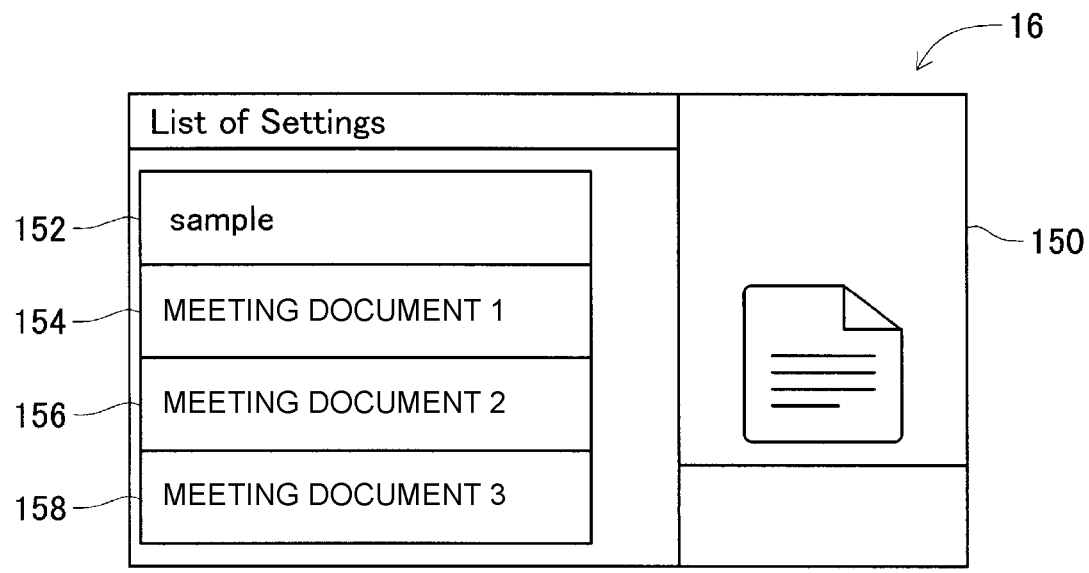
FIG. 6 depicts a setting information inputting template.
FIG. 7 depicts a file setting screen.

When MFP 10 acquires the file name of the file stored in the corresponding folder, MFP 10 displays a file selection screen 150 depicted in FIG. 7 on the display 16. The file selection screen 150 is a screen to select the e-mail setting file including the e-mail address of the transmission destination of the e-mail in the Scan to E-mail process. File names 152, 154, 156, 158, which are acquired from the corresponding folder, are displayed on the file selection screen 150.

Note that the four file names 152, 154, 156, 158 are displayed on the file selection screen 150 depicted in FIG. 7. The file name 152 is the file name of the setting information inputting template 140, and the file names 154, 156, 158 are the file names of the e-mail setting files. In other words, the setting information inputting template 140 and the three types of e-mail setting files are stored in the corresponding folder of the server 70. MFP 10 acquires, from the corresponding folder, the file name 152 of the setting information inputting template 140 and the file names 154, 156, 158 of the three types of e-mail setting files.

If a desired file name is selected on the file selection screen 150, MFP 10 acquires the file of the file name from the corresponding folder. Note that the file selection screen 150 is the screen to select the e-mail setting file including the e-mail address of the transmission destination of the e-mail as described above. Therefore, the user selects a desired file name of the file names 154, 156, 158 of the three types of e-mail setting files. Then, MFP 10 acquires, from the corresponding folder, the e-mail setting information of the e-mail setting file having the selected file name. In other words, the user selects a desired e-mail setting file from the e-mail setting files registered in the server 70 by using PC 50, and thus the e-mail setting information of the selected e-mail setting file is acquired from the corresponding folder. The user can select a desired e-mail setting file from the e-mail setting files registered by himself/herself. Therefore, the load exerted on the user is mitigated.

Figure 8:
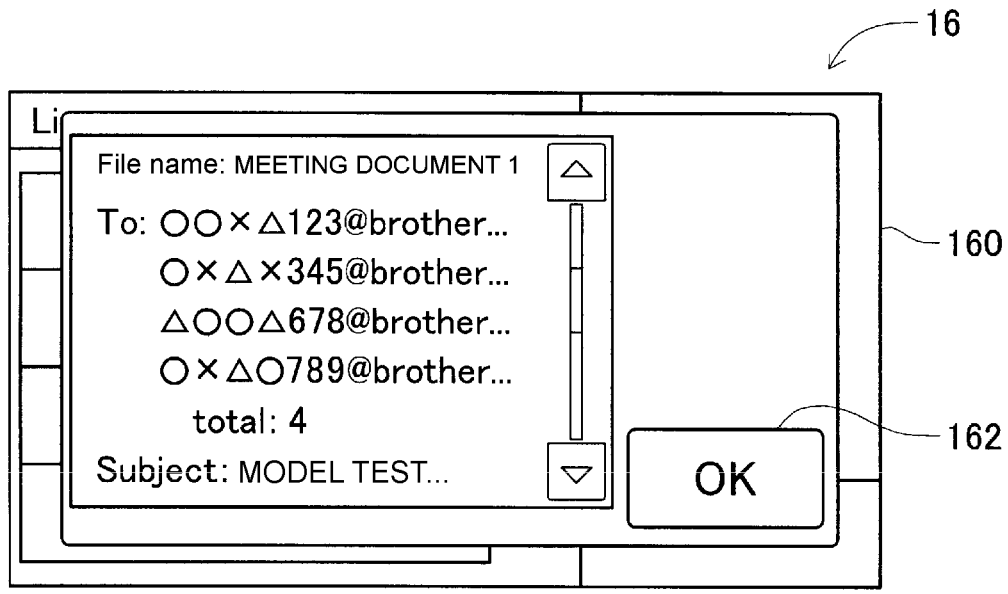
FIG. 8 depicts a file confirmation screen.

When MFP 10 acquires the e-mail setting information from the corresponding folder, a file confirmation screen 160 depicted in FIG. 8 is displayed on the display 16. The acquired e-mail setting information is displayed on the file confirmation screen 160. In other words, for example, the address of the transmission destination of the scan data upon the execution of the Scan to E-mail process, the subject of the e-mail when the scan data is transmitted, and the text of the e-mail when the scan data is transmitted are displayed on the file confirmation screen 160. Accordingly, the user can confirm details of the e-mail setting information.

Figure 4:
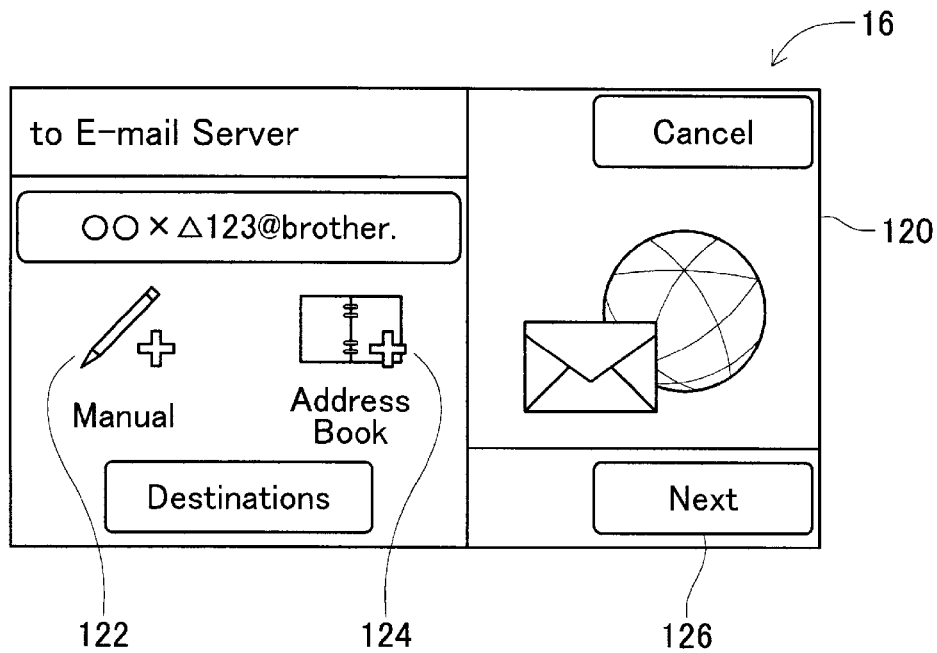
FIG. 4 depicts a destination setting screen.
Figure 9:
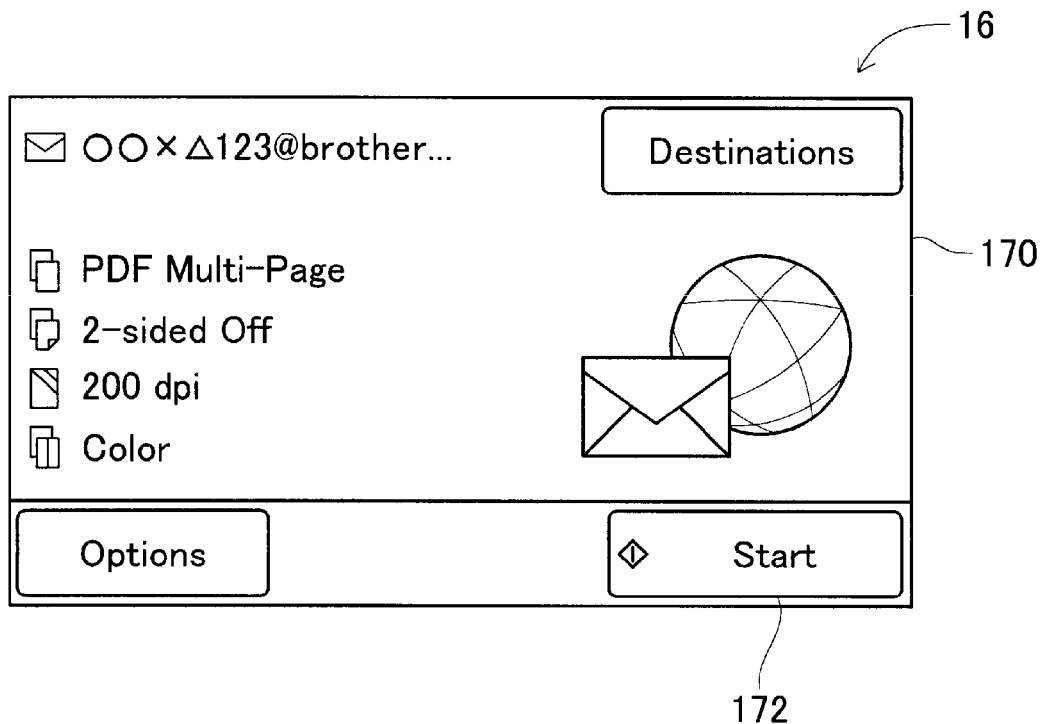
FIG. 9 depicts a scan setting screen.

Then, if an OK button 162 is operated on the file confirmation screen 160, the destination setting screen 120 depicted in FIG. 4 is displayed on the display 16. A NEXT button 126 is also displayed on the destination setting screen 120, other than the address registration button 122 and the address selection button 124 explained above. If the NEXT button 126 is operated, a scan setting screen 170 depicted in FIG. 9 is displayed on the display 16. The scan setting screen 170 is a screen to perform the scan setting when the Scan to E-mail process is executed. For example, the resolution and the scan color are set in accordance with the operation on the scan setting screen 170.

Then, if a start button 172 is operated on the scan setting screen 170 after the execution of the scan setting, the reading of an image is executed by the reading unit 20 in accordance with the scan setting having been set. Further, an e-mail is prepared in accordance with the e-mail setting information previously displayed on the file confirmation screen 160. In other words, the e-mail is prepared, in which the e-mail address included in the e-mail setting information is the transmission destination, and the subject and the text included in the e-mail setting information are inputted. Then, the scan data, which is prepared by reading the image, is attached to the e-mail, and the scan data is transmitted. Accordingly, the scan data is transmitted to the e-mail address which is registered in the server 70 by the user by using PC 50 and which is selected in MFP 10.

Figure 10:
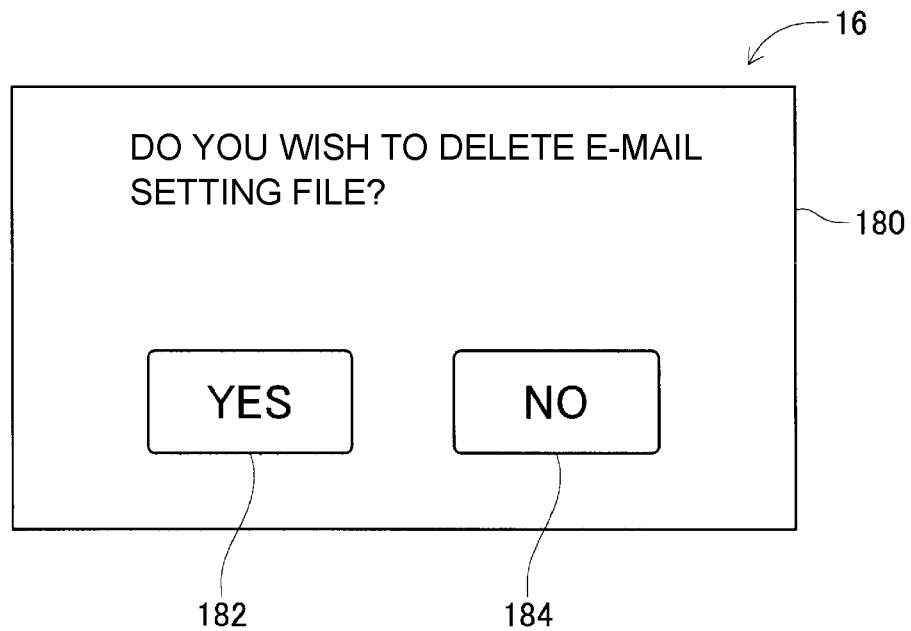
FIG. 10 depicts an information deletion confirmation screen.

When the scan data is transmitted to the e-mail address selected in MFP 10, an information deletion confirmation screen 180 depicted in FIG. 10 is displayed on the display 16. The information deletion confirmation screen 180 is a screen to confirm whether the e-mail setting file used upon the transmission of the scan data is deleted.

Accordingly, if a YES button 182 is operated on the information deletion confirmation screen 180, then MFP 10 accesses the corresponding folder of the server 70 after the transmission of the scan data, and MFP 10 deletes the e-mail setting file used upon the transmission of the scan data. Accordingly, it is possible to secure the confidentiality of the e-mail setting information, and it is possible to decrease the data amount stored in the server 70.

On the other hand, if a NO button 184 is operated on the information deletion confirmation screen 180, then the e-mail setting file used upon the transmission of the scan data is not deleted and maintained in the corresponding folder. Accordingly, the user can execute the Scan to E-mail process by utilizing the e-mail setting file again.

Note that in MFP 10, the Scan to E-mail process can be executed without registering the e-mail setting file by using the setting information inputting template 140. In other words, the Scan to E-mail process can be executed by means of the registration of the e-mail address in MFP 10 or the selection of the e-mail address from the e-mail addresses registered in MFP 10 as performed in the conventional technique.

Specifically, as described above, if the Scan to E-mail button 112 is operated on the scan process selection screen 110, and it is determined that both of the setting information inputting template and the e-mail setting file are not stored in the corresponding folder, then the setting intension confirmation screen 130 depicted in FIG. 5 is displayed on the display 16. Then, if the NO button 134 is operated on the setting intension confirmation screen 130, the destination setting screen 120 depicted in FIG. 4 is displayed on the display 16.

As described above, the address registration button 122 and the address selection button 124 are displayed on the destination setting screen 120. Therefore, the registration of the e-mail address in MFP 10 or the selection of the e-mail address from the e-mail addresses registered in MFP 10 is executed in accordance with the operation of each of the buttons. Then, if the NEXT button 126 is operated on the destination setting screen 120, and the following process, i.e., the operation on the scan setting screen 170 depicted in FIG. 9 is executed, then the Scan to E-mail process is executed.

Note that MFP 10 cannot access the corresponding folder of the server 70 in some cases on account of any communication failure or the like, when the login information such as user ID or the like is inputted into MFP 10 and MFP 10 accesses the corresponding folder of the server 70. In other words, MFP 10 cannot determine whether the file such as the setting information inputting template 140 or the like is stored in the corresponding folder in some cases. Even in such a situation, the Scan to E-mail process is executed in accordance with the conventional technique. In other words, when MFP 10 cannot access the corresponding folder of the server 70, if the Scan to E-mail button 112 is operated on the scan process selection screen 110, then the destination setting screen 120 depicted in FIG. 4 is displayed on the display 16. Then, the Scan to E-mail process is executed in accordance with the conventional technique by performing the operation on the destination setting screen 120 and the scan setting screen 170 in accordance with the technique described above.

Further, even when PC 50 receives the access information from MFP 10 after MFP 10 uploads the setting information inputting template 140 to the corresponding folder of the server 70, the user does not access the corresponding folder of the server 70 by using the access information in some cases. In other words, the e-mail setting information such as the e-mail address or the like is not inputted into the setting information inputting template 140 uploaded to the corresponding folder of the server 70, and the setting information inputting template 140 is unedited in some cases. In such a situation, if the Scan to E-mail button 112 is operated on the scan process selection screen 110 depicted in FIG. 3, a screen, which prompts the editing of the setting information inputting template 140, i.e., the preparation of the e-mail setting file, is displayed on the display 16.

Specifically, if the setting information inputting template 140 uploaded to the corresponding folder of the server 70 is unedited, then only the setting information inputting template 140 is stored in the corresponding folder, and any e-mail setting file is not stored.

Figure 11:
FIG. 11 depicts an editing notice screen.

Accordingly, if the Scan to E-mail button 112 is operated on the scan process selection screen 110, and it is determined that the setting information inputting template 140 is stored in the corresponding folder but any e-mail setting file is not stored, then an editing notice screen 190 depicted in FIG. 11 is displayed on the display 16. A comment, which prompts the access to the corresponding folder of the server 70 and the registration of the e-mail setting file based on the use of the setting information inputting template 140, is displayed on the editing notice screen 190. Accordingly, if the setting information inputting template 140 is unedited, it is possible to prompt the user to perform the editing of the setting information inputting template 140, i.e., the registration of the e-mail setting file.

Note that if an OK button 192 is operated on the editing notice screen 190, the destination setting screen 120 depicted in FIG. 4 is displayed on the display 16. Then, if the user wishes the Scan to E-mail process in accordance with the conventional technique, then, for example, the registration of the e-mail address in MFP 10 is performed by using the destination setting screen 120, and the operation described above is executed. Further, if the user wishes the Scan to E-mail process based on the use of the setting information inputting template 140, then the user accesses the corresponding folder of the server 70 by using the access information from PC 50, and the setting information inputting template 140 is edited. Accordingly, the Scan to E-mail process can be executed by using the setting information inputting template 140.

<Control Program>

The Scan to E-mail process described above is performed by executing the control program 32 by CPU 12 of MFP 10. An explanation will be made below with reference to FIGS. 12 to 16 about the flow when the control program 32 is executed.

Figure 12A:
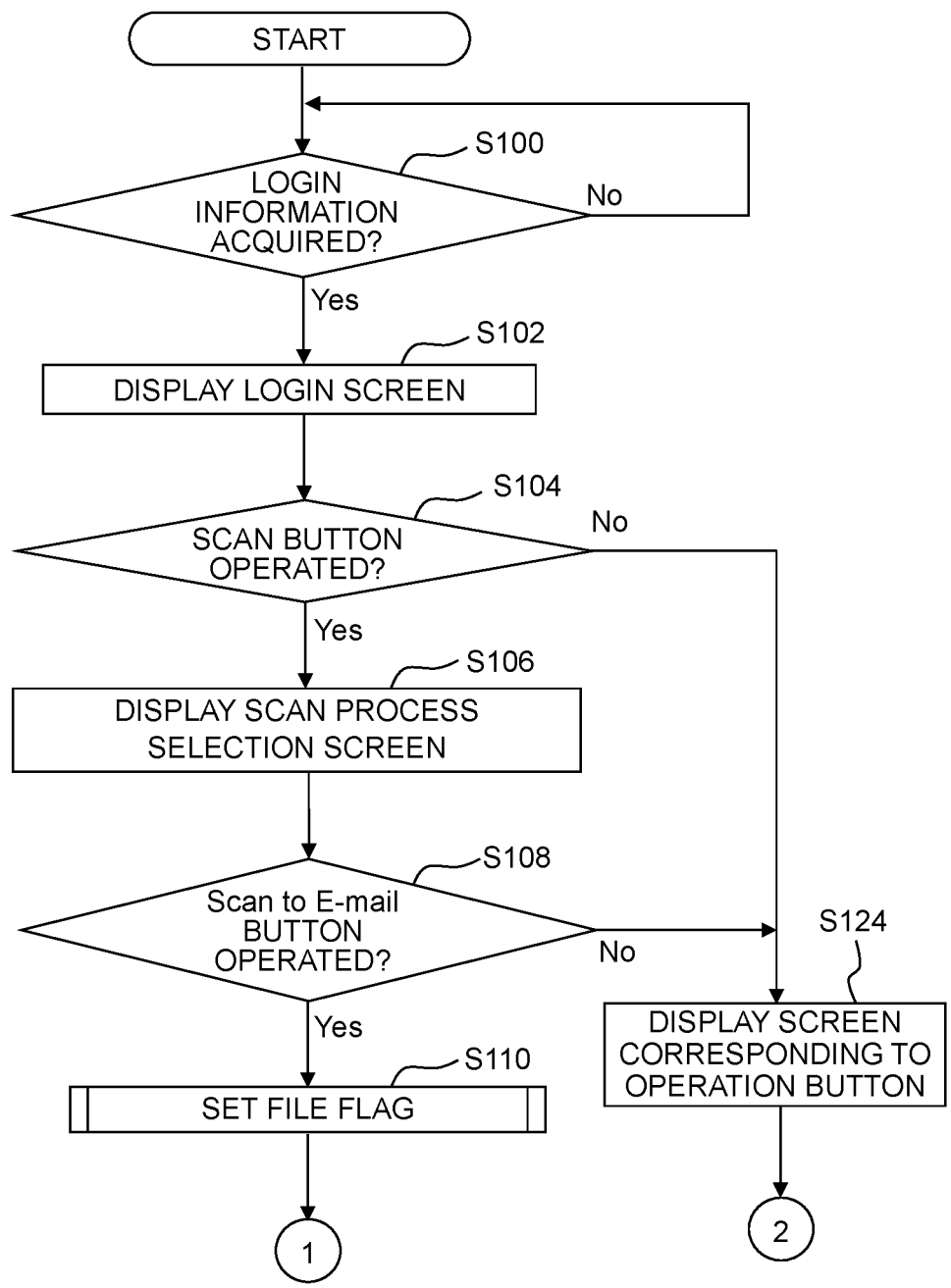
FIGS. 12A and 12B depict a flow chart of a control program according to a first embodiment.
Figure 12B:
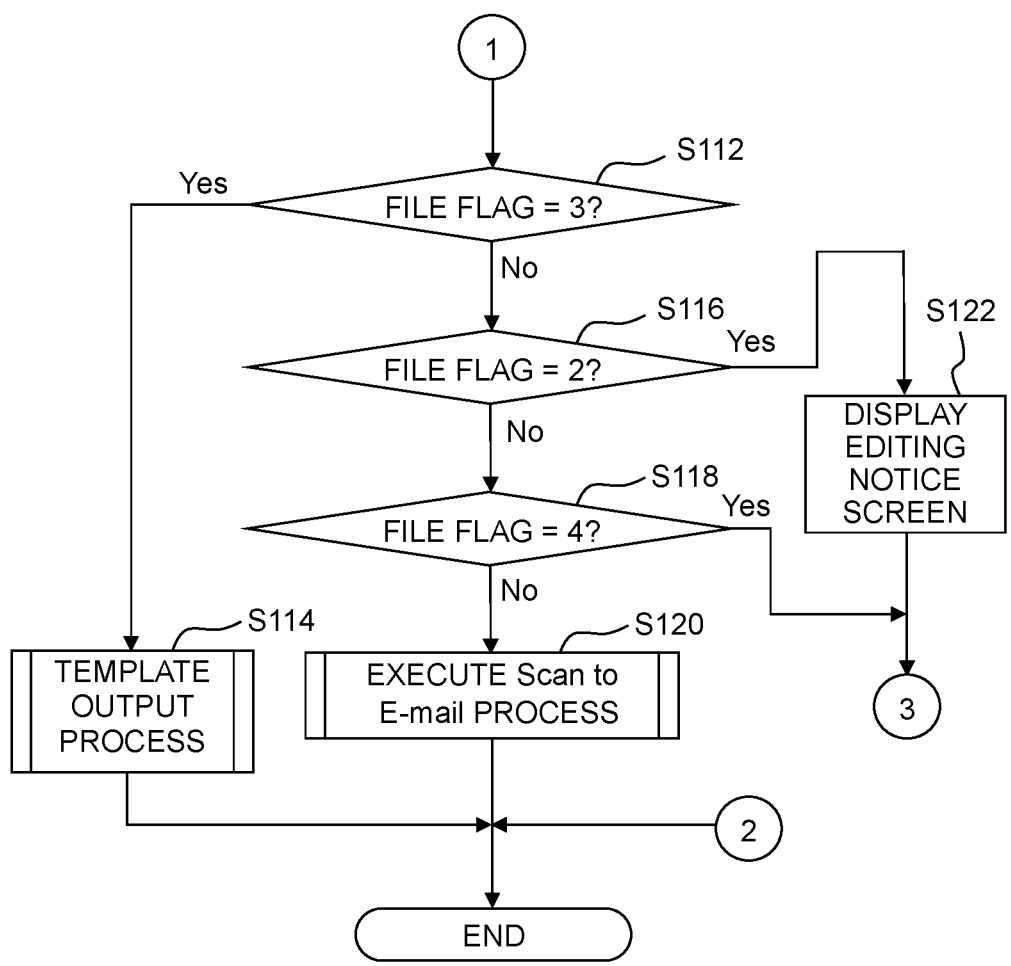
Figure 13:
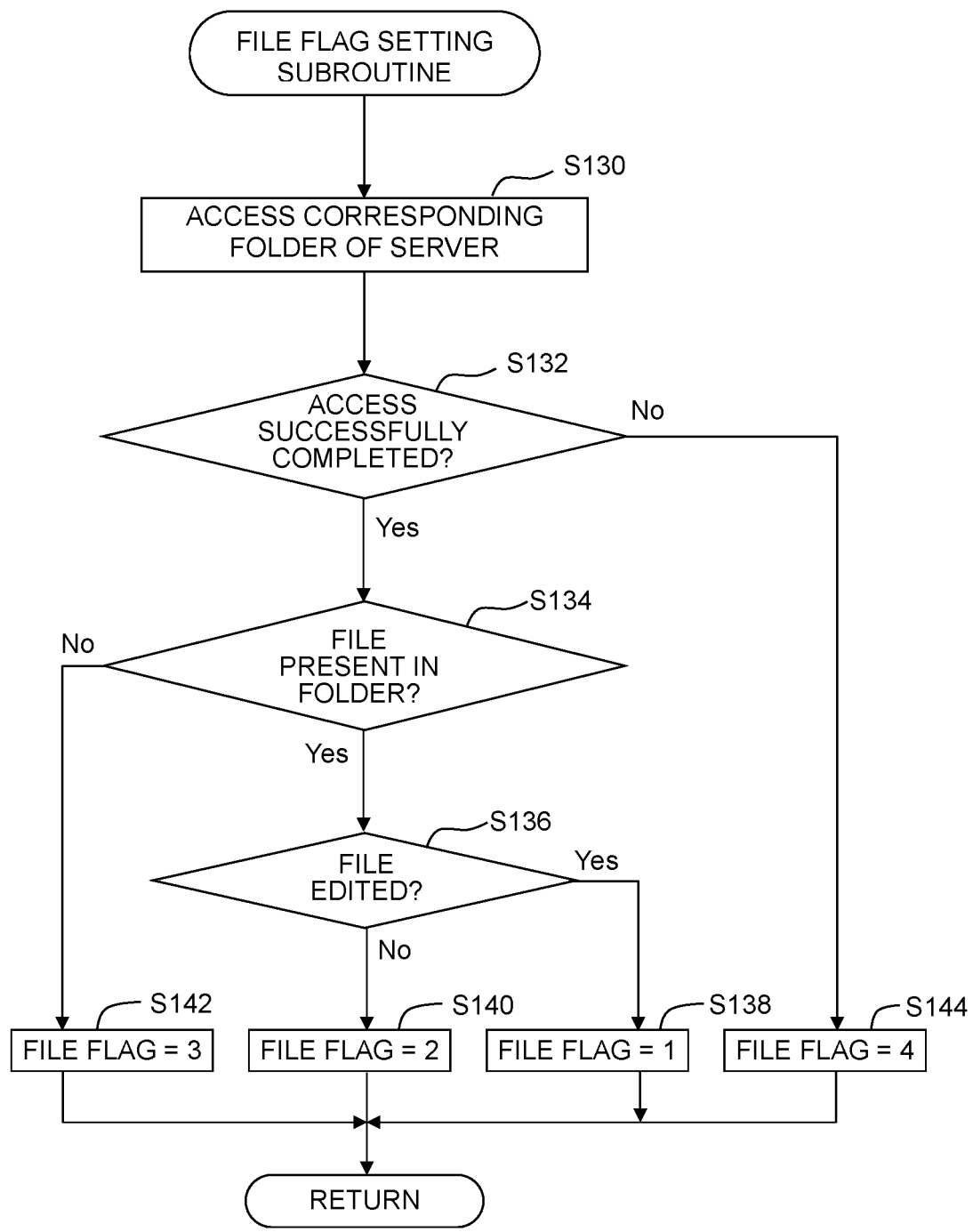
FIG. 13 depicts a flow chart of the control program according to the first embodiment.

At first, it is determined by CPU 12 whether MFP 10 acquires the login information (S100: see FIG. 12). If MFP 10 does not acquire the login information (S100: NO), the process of S100 is repeated. On the other hand, if MFP 10 acquires the login information (S100: YES), the login screen 100 is displayed on the display 16 of MFP 10 (S102). Subsequently, it is determined by CPU 12 whether the scan button 106 is operated on the login screen 100 (S104). If the scan button 106 is operated on the login screen 100 (S104: YES), the scan process selection screen 110 is displayed on the display 16 (S106).

Then, it is determined by CPU 12 whether the Scan to E-mail button 112 is operated on the scan process selection screen 110 (S108). If the Scan to E-mail button 112 is operated on the scan process selection screen 110 (S108: YES), the routine proceeds to S110.

In S110, the file flag setting subroutine is executed. In the file flag setting subroutine, MFP 10 accesses the corresponding folder of the server 70 (S130: see FIG. 13). In this procedure, it is determined by CPU 12 whether the access to the corresponding folder of the server 70 is successfully completed (S132).

If the access to the corresponding folder of the server 70 is successfully completed (S132: YES), it is determined by CPU 12 whether the file is present in the corresponding folder, i.e., whether at least one of the setting information inputting template 140 and the e-mail setting file is present (S134). If at least one of the setting information inputting template 140 and the e-mail setting file is present in the corresponding folder (S134: YES), it is determined by CPU 12 whether the setting information inputting template 140 is edited (S136).

If the setting information inputting template 140 is edited (S136: YES), the file flag is set to 1 (S138). "file flag=1" means that at least one of the setting information inputting template 140 and the e-mail setting file is stored in the corresponding folder of the server 70, and the setting information inputting template 140 is edited. In other words, "file flag=1" means that at least the e-mail setting file is stored. Then, the file flag setting subroutine is terminated.

Further, if the setting information inputting template 140 is not edited (S136: NO), the file flag is set to 2 (S140). "file flag=2" means that at least one of the setting information inputting template 140 and the e-mail setting file is stored in the corresponding folder of the server 70, and the setting information inputting template 140 is not edited. In other words, "file flag=2" means that the setting information inputting template is stored but the e-mail setting file is not stored. Then, the file flag setting subroutine is terminated.

Further, if both of the setting information inputting template 140 and the e-mail setting file are absent in the corresponding folder in S134 (S134: NO), the file flag is set to 3 (S142). "file flag=3" means that both of the setting information inputting template 140 and the e-mail setting file are not stored in the corresponding folder of the server 70. Then, the file flag setting subroutine is terminated.

Further, if the access to the corresponding folder of the server 70 is not successfully completed in S132 (S132: NO), the file flag is set to 4 (S144). "file flag=4" means that it was impossible to access the corresponding folder of the server 70. Then, the file flag setting subroutine is terminated.

If the file flag setting subroutine is terminated, it is determined by CPU 12 whether the file flag is 3 (S112: see FIG. 12). If the file flag is 3, i.e., if both of the setting information inputting template 140 and the e-mail setting file are not stored in the corresponding folder of the server 70 (S112: YES), the template output process subroutine is executed (S114).

Figure 14:
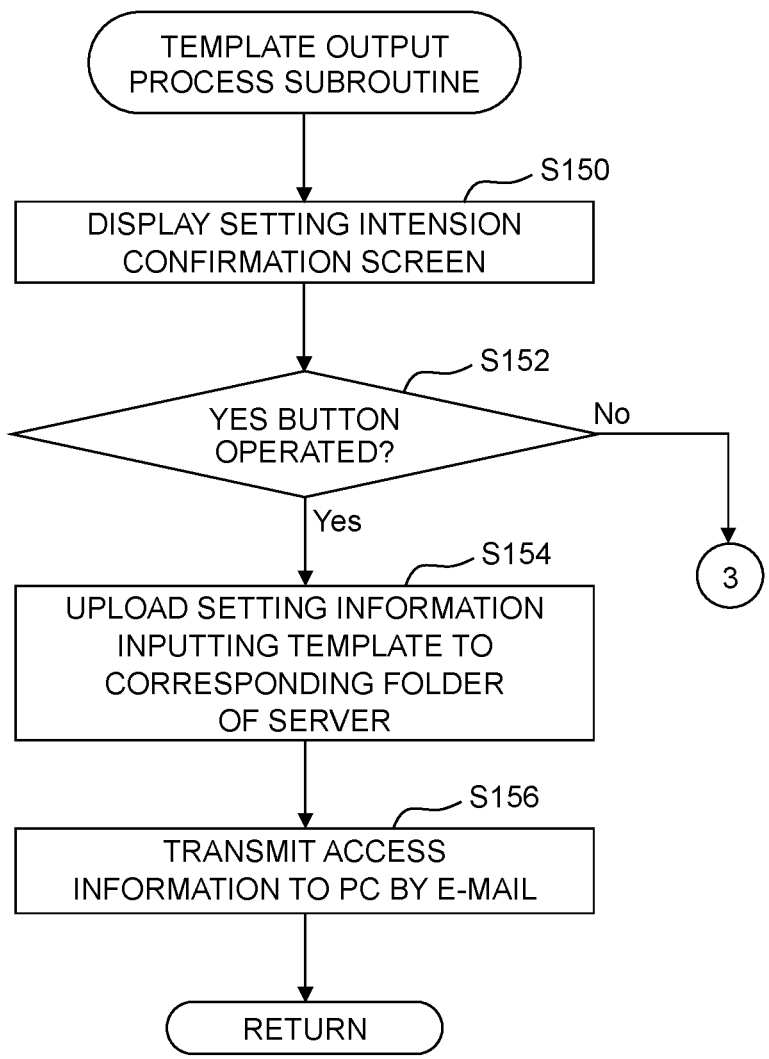
FIG. 14 depicts a flow chart of the control program according to the first embodiment.

In the template output process subroutine, the setting intension confirmation screen 130 is displayed on the display 16 (S150: see FIG. 14). Then, it is determined whether the YES button 132 is operated on the setting intension confirmation screen 130 (S152). If the YES button 132 is operated on the setting intension confirmation screen 130 (S152: YES), then MFP 10 accesses the corresponding folder of the server 70, and the setting information inputting template 140 is uploaded to the corresponding folder (S154). Subsequently, MFP 10 transmits the access information to PC 50 by e-mail (S156). Then, the template output process subroutine is terminated. Accordingly, the control program 32 is terminated.

Further, if the file flag is not 3 in S112 (see FIG. 12) (S112: NO), it is determined by CPU 12 whether the file flag is 2 (S116). Then, if the file flag is not 2 (S116: NO), it is determined by CPU 12 whether the file flag is 4 (S118). In this procedure, if the file flag is not 4 (S118: NO), i.e., if the file flag is 1, in particular, if at least the e-mail setting file is stored in the corresponding folder of the server 70, then the Scan to E-mail process execution subroutine is executed (S120).

Figure 15:
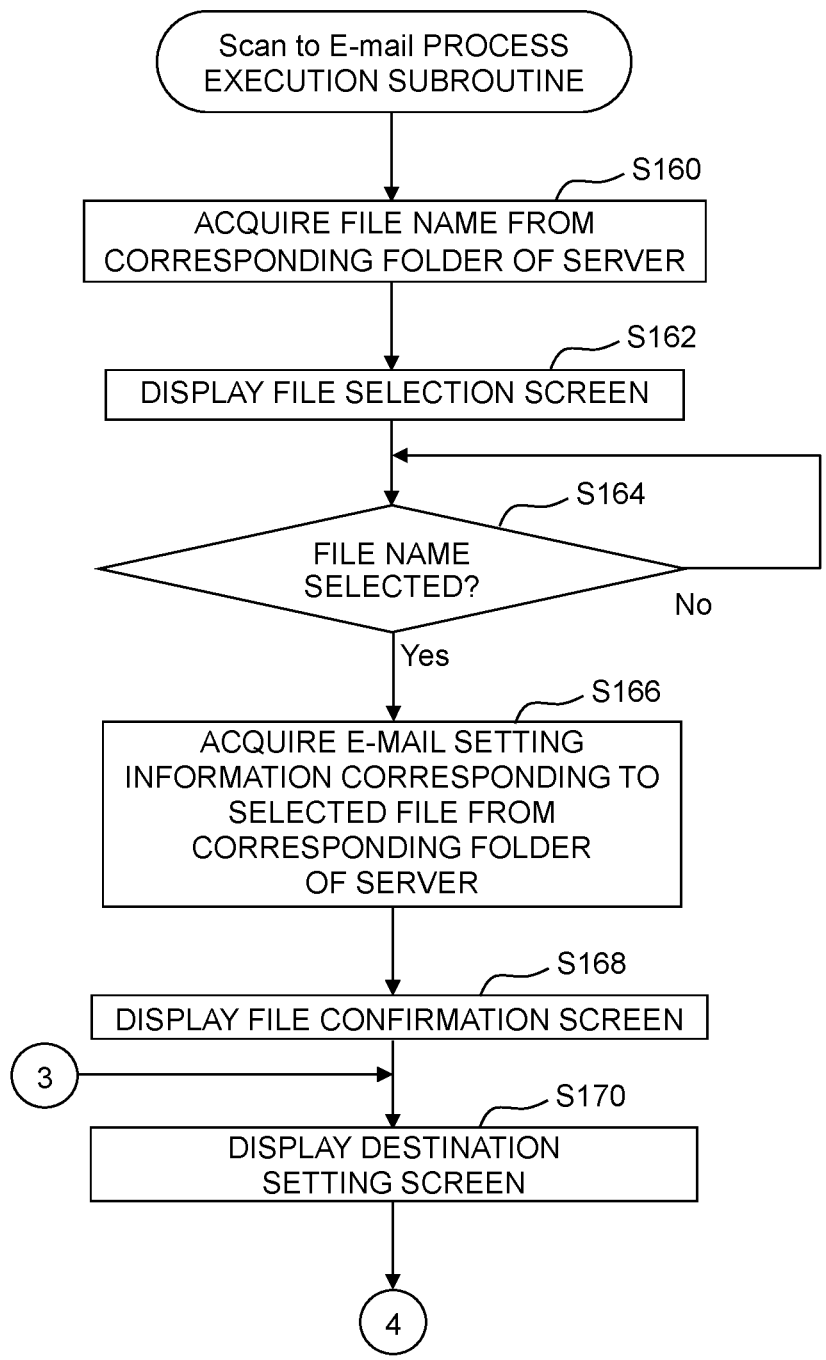
FIG. 15 depicts a flow chart of the control program according to the first embodiment.

In the Scan to E-mail process execution subroutine, MFP 10 acquires the file name from the corresponding folder of the server 70 (S160: see FIG. 15). Then, the file selection screen 150, which is provided to select a desired file name from acquired file names, is displayed on the display 16 (S162). Subsequently, it is determined by CPU 12 whether the desired file name is selected on the file selection screen 150 (S164). In this procedure, if the desired file name is not selected (S164: NO), the process of S164 is repeated.

On the other hand, if the desired file name is selected (S164: YES), MFP 10 acquires, from the corresponding folder, the e-mail setting information of the e-mail setting file having the selected file name (S166). Then, the file confirmation screen 160 is displayed on the display 16 on the basis of the acquired e-mail setting information (S168). Subsequently, if the OK button 162 is operated on the file confirmation screen 160, the destination setting screen 120 is display on the display 16 (S170).

Figure 16:
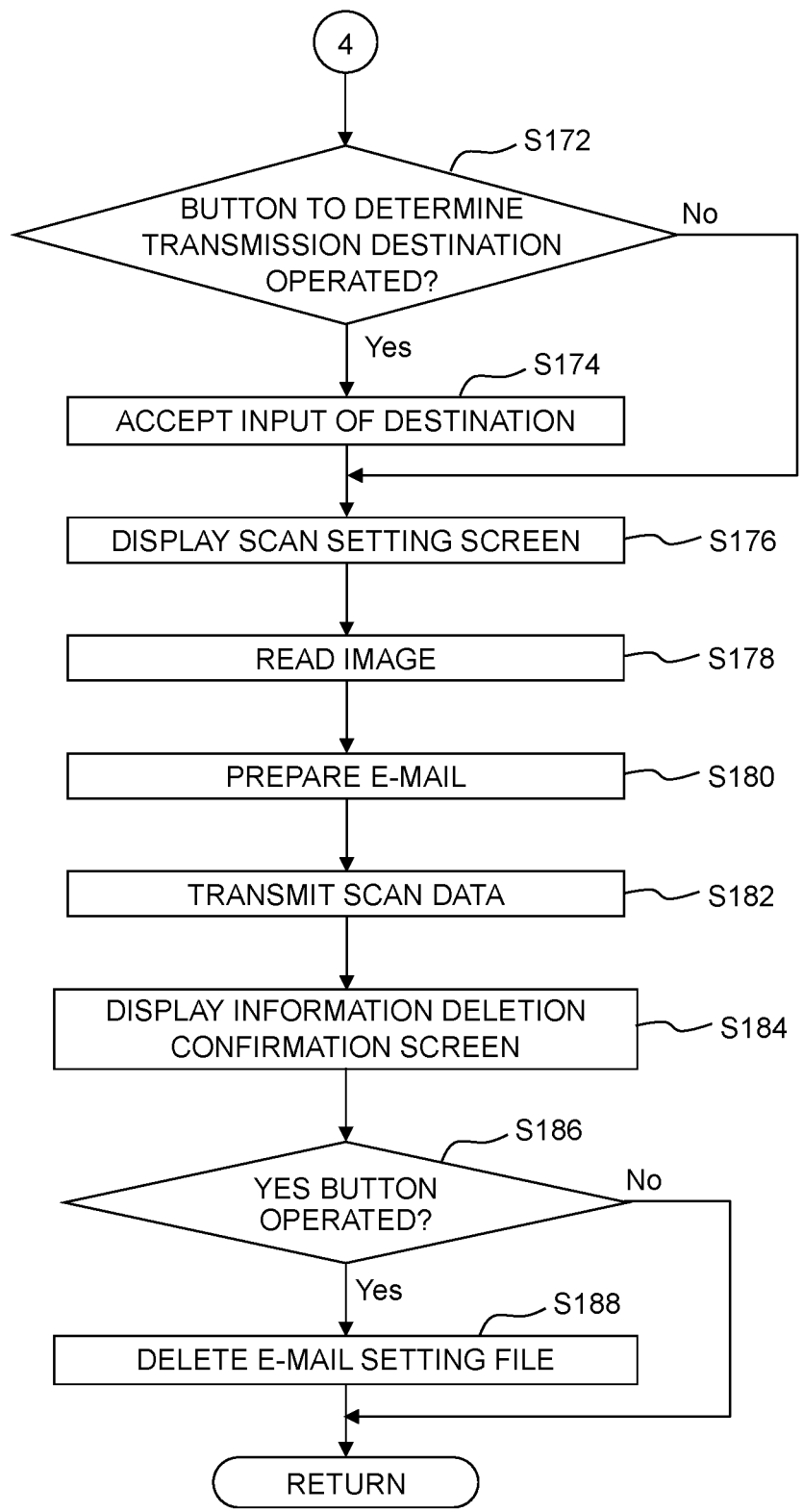
FIG. 16 depicts a flow chart of the control program according to the first embodiment.

It is determined by CPU 12 whether the button to determine the transmission destination of the scan data, i.e., the address registration button 122 or the address selection button 124 is operated on the destination setting screen 120 (S172: see FIG. 16). If the address registration button 122 or the address selection button 124 is operated (S172: YES), MFP 10 accepts, for example, the inputted e-mail address in accordance with the operation of input I/F 18 (S174). Then, the routine proceeds to S176.

On the other hand, if the address registration button 122 or the address selection button 124 is not operated (S172: NO), and the NEXT button 126 is operated, then the process of S174 is skipped, and the routine proceeds to S176. In S176, the scan setting screen 170 is display on the display 16. Then, if the start button 172 is operated on the scan setting screen 170, the reading of the image is thereby executed by the reading unit 20 (S178).

Subsequently, the e-mail is prepared on the basis of the e-mail setting information acquired in S166 (S180). Then, the scan data, which is prepared by the reading of the image executed in S178, is attached to the prepared e-mail, followed by being transmitted (S182). Subsequently, the information deletion confirmation screen 180 is displayed on the display 16 (S184). Then, it is determined by CPU 12 whether the YES button 182 is operated on the information deletion confirmation screen 180 (S186).

If the YES button 182 is operated on the information deletion confirmation screen 180 (S186: YES), MFP 10 accesses the corresponding folder of the server 70 to delete the e-mail setting file including the e-mail setting information used when the e-mail is prepared (S188). Then, the Scan to E-mail process execution subroutine is terminated, and the control program 32 is terminated. Further, if the YES button 182 is not operated on the information deletion confirmation screen 180 (S186: NO), but the NO button 184 is operated, then the process of S188 is skipped, the Scan to E-mail process execution subroutine is terminated, and the control program 32 is terminated. Further, if the YES button 132 is not operated on the setting intention confirmation screen 130 in S152 of the template output process subroutine (see FIG. 14) (S152: NO), but the NO button 134 is operated, then the routine proceeds to S170, and the processes of S170 and the followings are executed.

If the file flag is 2 in S116 (see FIG. 12) (S116: YES), i.e., if the setting information inputting template 140 is stored in the corresponding folder of the server 70, but the e-mail setting file is not stored, then the editing notice screen 190 is displayed on the display 16 (S122). Then, the processes of S170 and the followings are executed.

Further, if the file flag is 4 in S118 (see FIG. 12) (S118: YES), i.e., if MFP 10 cannot access the corresponding folder of the server 70, then the routine proceeds to S170, and the processes of S170 and the followings are executed.

Further, if the scan button 106 is not operated in S104 (see FIG. 12) (S104: NO), and any other button such as the facsimile button 102 or the like is operated, and if the Scan to E-mail button 112 is not operated in S108 (S108: NO), and any other button 114, 116 other than the Scan to E-mail button 112 is operated, then the screen, which corresponds to the operated button, is displayed on the display 16 (S124). Then, the control program is terminated.

Figure 17:
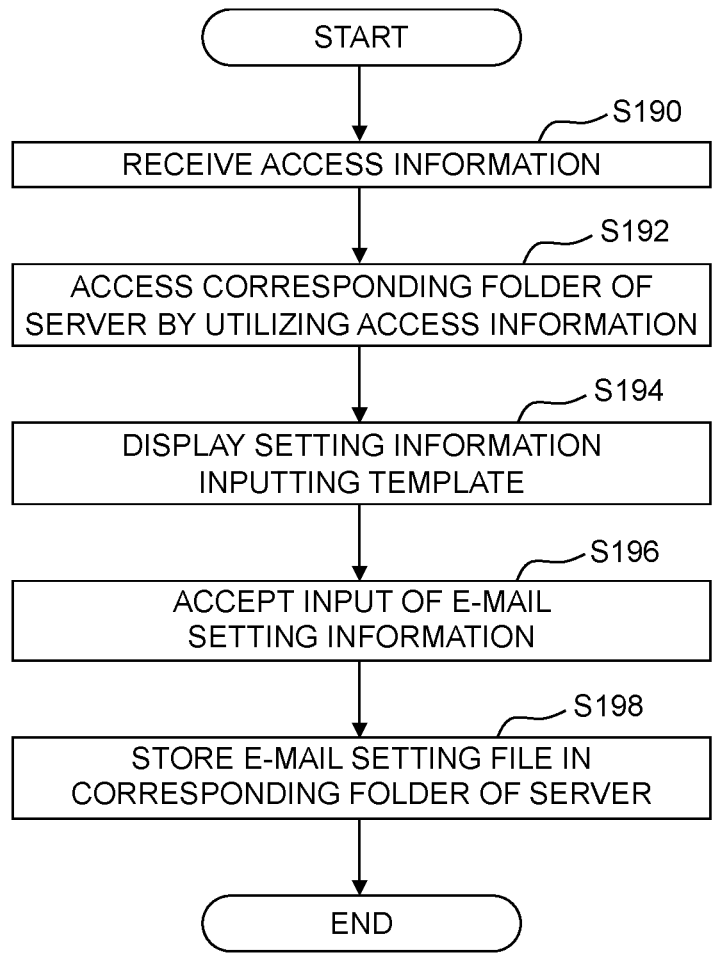
FIG. 17 depicts a flow chart of the control program according to the first embodiment.

The Scan to E-mail process described above is performed by executing the control program 64 by CPU 52 of PC 50. An explanation will be made below with reference to FIG. 17 about the flow when the control program 64 is executed.

At first, PC 50 receives the access information from MFP 10 by the e-mail (S190). Subsequently, PC 50 accesses the corresponding folder of the server 70 by utilizing the access information (S192). Subsequently, PC 50 displays, on the display 56, the setting information inputting template 140 stored in the corresponding folder (S194). In this procedure, PC 50 accepts the input of the e-mail setting information to the setting information inputting template 140 displayed on the display 56 (S196). Then, PC 50 stores the e-mail setting file including the inputted e-mail setting information in the corresponding folder of the server 70 (S198). Accordingly, the control program 64 is terminated.

Second Embodiment

In the first embodiment described above, MFP 10 uploads the setting information inputting template 140 to the corresponding folder of the server 70. However, in a second embodiment, MFP 10 transmits the setting information inputting template 140 to PC 50.

Specifically, a user transmits a blank e-mail to MFP 10 by using PC 50. If MFP 10 receives the blank e-mail from PC 50, MFP 10 transmits a reply e-mail with respect to the blank e-mail. However, the setting information inputting template 140 is attached to the reply e-mail. Accordingly, the user acquires the setting information inputting template 140. Then, the user inputs the e-mail setting information into the acquired setting information inputting template by using PC 50 to prepare the e-mail setting file.

Note that the user has previously acquired the access information, i.e., URL with which it is possible access the corresponding folder of the server 70. Therefore, the user accesses the corresponding folder of the server 70 by utilizing the access information from PC 50. Then, the e-mail setting file, which is prepared by utilizing the setting information inputting template 140, is stored in the corresponding folder of the server 70. Accordingly, the e-mail setting file is registered in the corresponding folder of the server 70.

If the e-mail setting file is registered in the corresponding folder of the server 70 in accordance with the procedure as described above, MFP 10 accesses the corresponding folder of the server 70 on the basis of the inputted login information to determine whether the file is present in the corresponding folder. For example, the file selection screen 150 is displayed depending on whether the file is present in the corresponding folder, and the Scan to E-mail process is executed. The processes, which are performed after the e-mail setting file is registered in the corresponding folder of the server 70, are the same as those of the first embodiment, any explanation of which is omitted.

In this way, in the second embodiment, if MFP 10 receives the blank e-mail from PC 50, MFP 10 attaches the setting information inputting template 140 to the replay e-mail to be sent to PC 50. Then, the e-mail setting file, which is prepared by utilizing the setting information inputting template 140 with PC 50, is stored in the corresponding folder of the server 70. Accordingly, also in the second embodiment, the e-mail setting file can be registered by using, for example, the keyboard of PC 50 having the high operability, in the same manner as in the first embodiment. The load exerted on the user is mitigated. Further, when the setting information inputting template 140 is used, the load exerted when the e-mail setting information is inputted is thereby mitigated. Furthermore, the e-mail setting file is stored in the corresponding folder of the server 70. Therefore, the user can select a desired e-mail setting file from the e-mail setting files registered by himself/herself. The load exerted on the user is mitigated.

Further, in the second embodiment, the registration of the e-mail setting file in the corresponding folder of the server 70 is performed by executing the control program 32 by CPU 12 of MFP 10 and executing the control program 64 by CPU 52 of PC 50. In the following description, the flow, which is provided when the control program 32 of MFP 10 is executed, will be explained with reference to FIG. 18, and the flow, which is provided when the control program 64 of PC 50 is executed, will be explained with reference to FIG. 19.

Figure 18:
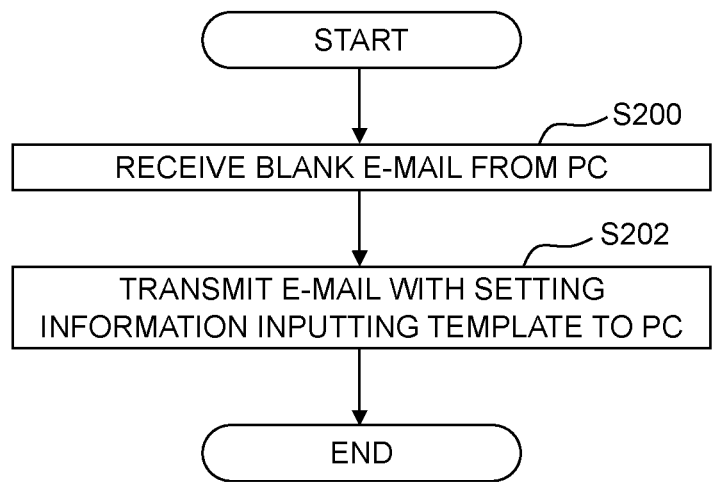
FIG. 18 depicts a flow chart of a control program according to a second embodiment.

At first, in the flow of the control program 32 of MFP 10, MFP 10 receives the blank e-mail transmitted from PC 50 (S200: see FIG. 18). The e-mail, to which the setting information inputting template 140 is attached, is transmitted by MFP 10 as the reply e-mail of the received blank e-mail to PC 50 (S202). Accordingly, the control program 32 is terminated.

Figure 19:
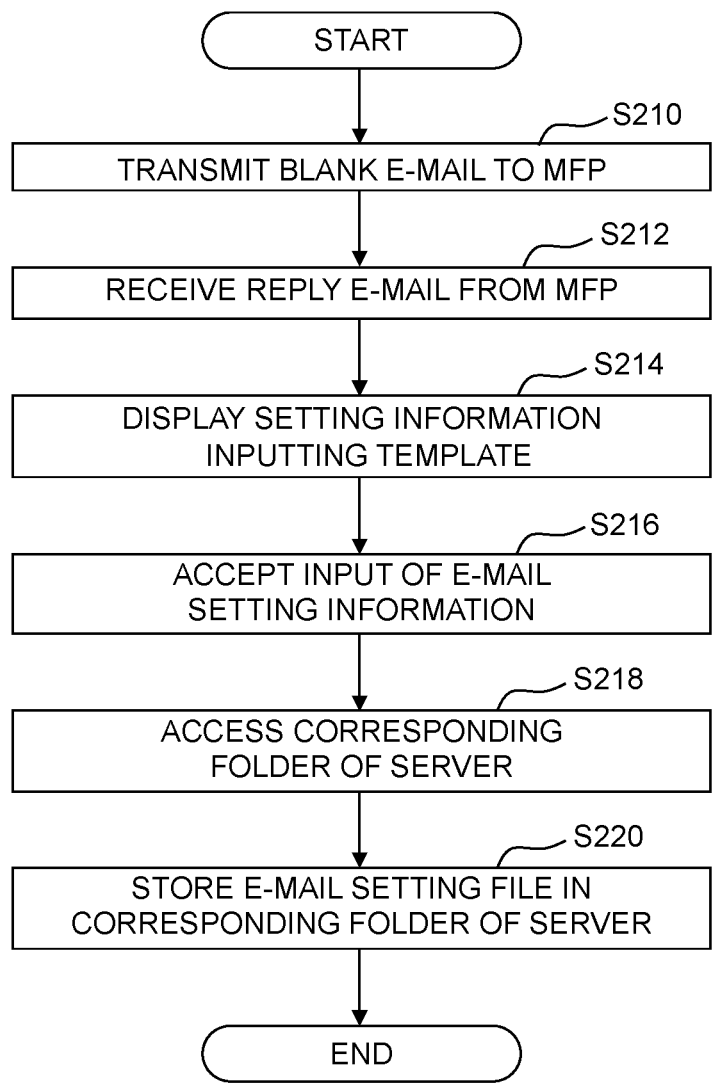
FIG. 19 depicts a flow chart of a control program according to the second embodiment.

Further, in the flow of the control program 64 of PC 50, PC 50 transmits the blank e-mail to MFP 10 (S210: see FIG. 19). Subsequently, the reply e-mail, to which the setting information inputting template 140 is attached, is received by PC 50 from MFP 10 (S212). Subsequently, PC 50 displays, on the display 56, the setting information inputting template 140 attached to the replay e-mail (S214). Then, PC 50 accepts the input of the e-mail setting information with respect to the displayed setting information inputting template 140 (S216). Accordingly, the e-mail setting file is prepared.

Subsequently, PC 50 accesses the corresponding folder of the server 70 (S218). Then, the previously prepared e-mail setting file is stored by PC 50 in the corresponding folder of the server 70. Thus, the e-mail setting file is registered in the corresponding folder of the server 70 (S220). Accordingly, the control program 64 is terminated.

The present teaching is not limited to the embodiments described above. The present teaching can be carried out in various forms applied with various changes and/or improvements on the basis of the knowledge of those skilled in the art. Specifically, for example, in the embodiments described above, the setting information inputting template 140 is uploaded to the server 70. However, the setting information inputting template 140 may be stored in the data storage area 34 of MFP 10. Note that in this case, folders, which are comparted for respective user ID's, are prepared in the data storage area 34 of MFP 10. The setting information inputting template 140 is stored in the corresponding folder of the plurality of folders.

Further, in the embodiments described above, the user is informed of the information which prompts the editing of the setting information inputting template 140, by displaying the editing notice screen 190 on the display 16. However, the user may be informed of the information by means of, for example, the voice output or the printing on the printing paper.

Further, in the embodiments described above, the examples, in which the processes depicted in FIGS. 12 to 19 are executed by CPU's 12, 52, have been explained. However, the processes may be executed by ASIC or any other logic integrated circuit without being limited to CPU's 12, 52. The processes may be executed by cooperating, for example, CPU, ASIC, and any other logic integrated circuit.

Further, in the embodiments described above, the example has been explained, in which MFP 10 accesses the corresponding folder of the server 70 in accordance with a trigger of the operation of the Scan to E-mail button 112. However, it is also allowable to adopt such an arrangement that MFP 10 accesses the corresponding folder of the server 70 in accordance with a trigger of the successful login authentication performed by the user. If such an arrangement is adopted, the access to the corresponding folder is started in MFP 10 at the timing at which the login information such as user ID or the like is inputted into MFP 10. Accordingly, for example, the access to the corresponding folder is executed concurrently with the display of the screen including, for example, the login screen 100 and the scan process selection screen 110. Therefore, the access to the corresponding folder can be executed by utilizing the time in which the login screen 100 is displayed on the display 16. It is possible to decrease the waiting time of the user brought about when the Scan to E-mail button 112 is operated.

Further, in the embodiments described above, MFP 10 notifies the user of the access information by transmitting the e-mail to PC 50. However, MFP 10 may notify the user of the access information, for example, by printing the access information on the printing paper or displaying the access information on the display 16.

What is claimed is:

1. An image reading apparatus comprising:
a scanner configured to read an image from a document; and
a controller configured to:
output, to one of a storage apparatus and an information processing apparatus, which are separate from the image reading apparatus, a template for inputting, via an interface of the information processing apparatus, e-mail setting information including at least a destination;
acquire the e-mail setting information included in an e-mail setting file from the storage apparatus in which the e-mail setting file is stored, the email setting file being stored in an area of the storage apparatus corresponding to user information, wherein the e-mail setting file is prepared based on the email setting information input into the template, and wherein the acquiring includes accessing, based on the user information, the e-mail setting file stored in the area of the storage apparatus; and
send image data read by the scanner to the destination included in the acquired e-mail setting information.

2. The image reading apparatus according to claim 1, wherein the controller is configured to:
acquire the user information;
store the template in a predetermined area of the storage apparatus corresponding to the acquired user information; and
output, to the information processing apparatus, access information to allow access to the predetermined area of the storage apparatus in which the template is stored for preparation of the e-mail setting file.

3. The image reading apparatus according to claim 2, wherein, before outputting the template, the controller is configured to determine whether at least one of the template and the e-mail setting file is stored in the predetermined area of the storage apparatus, and
based on determining that both of the template and the e-mail setting file are not stored, the controller is configured to output the template to the storage apparatus.

4. The image reading apparatus according to claim 3, wherein the controller is configured to determine whether at least one of the template and the e-mail setting file is stored at a timing at which the user information is acquired.

5. The image reading apparatus according to claim 2, wherein the controller is configured to:

determine whether the e-mail setting file is stored in the predetermined area, if the template is stored in the predetermined area of the storage apparatus; and inform a user of information to prompt preparation of the e-mail setting file by utilizing the template stored in the predetermined area, if it is determined that the e-mail setting file is not stored in the predetermined area.

6. The image reading apparatus according to claim 2, wherein outputting the access information includes sending the access information to the information processing apparatus by e-mail.

7. The image reading apparatus according to claim 1, wherein under a condition that an email is received from the information processing apparatus before outputting the template, the controller is configured to:

output the template to the information processing apparatus; and acquire the e-mail setting information included in the e-mail setting file from the storage apparatus which stores the e-mail setting file prepared based on the template outputted to the information processing apparatus.

8. The image reading apparatus according to claim 1, further comprising a display, wherein the controller is configured to display, on the display, a screen to confirm whether the e-mail setting file including the e-mail setting information is deleted, after sending the image data to the destination included in the e-mail setting information.

9. The image reading apparatus according to claim 1, wherein the e-mail setting information includes the destination and a file name of the e-mail setting file in which the e-mail setting information is included, and the controller is configured to:

acquire at least one file name included in at least one of the e-mail setting information; and acquire the e-mail setting information included in the e-mail setting file having one file name, if the one file name of the at least one file name is designated by an operation performed by a user.

10. The image reading apparatus according to claim 1, wherein the storage apparatus is part of a server separate from the image reading apparatus.

11. A non-transitory computer-readable medium storing a program executable by a computer of an image reading apparatus provided with a scanner for reading an image from a document, the program causing the computer of the image reading apparatus to:

output, to one of a storage apparatus and an information processing apparatus, which are separate from the image reading apparatus, a template for inputting, via an interface of the information processing apparatus, e-mail setting information including at least a destination;

acquire the e-mail setting information included in an e-mail setting file from the storage apparatus in which the e-mail setting file is stored, the email setting file being stored in an area of the storage apparatus corresponding to user information, wherein the e-mail setting file is prepared based on the email setting information input into the template, and wherein the acquiring includes accessing, based on the user information, the e-mail setting file stored in the area of the storage apparatus; and send image data read by the scanner to the destination included in the acquired e-mail setting information.

* * * * *